(12) United States Patent
Zhang et al.

(10) Patent No.: US 11,644,570 B2
(45) Date of Patent: May 9, 2023

(54) DEPTH INFORMATION ACQUISITION SYSTEM AND METHOD, CAMERA MODULE, AND ELECTRONIC DEVICE

(71) Applicant: VIVO MOBILE COMMUNICATION CO.,LTD., Guangdong (CN)

(72) Inventors: Wei Zhang, Chang'an Dongguan (CN); Weiwei Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 394 days.

(21) Appl. No.: 16/650,655

(22) PCT Filed: Aug. 28, 2018

(86) PCT No.: PCT/CN2018/102694
§ 371 (c)(1),
(2) Date: Mar. 25, 2020

(87) PCT Pub. No.: WO2019/062430
PCT Pub. Date: Apr. 4, 2019

(65) Prior Publication Data
US 2020/0225350 A1  Jul. 16, 2020

(30) Foreign Application Priority Data

Sep. 27, 2017 (CN) .......................... 201710891594.3

(51) Int. Cl.
*G01S 17/08* (2006.01)
*G01S 17/894* (2020.01)

(52) U.S. Cl.
CPC ............ *G01S 17/08* (2013.01); *G01S 17/894* (2020.01)

(58) Field of Classification Search
None
See application file for complete search history.

(56) References Cited

U.S. PATENT DOCUMENTS

2009/0091738 A1* 4/2009 Morcom ................ G01S 17/89
356/5.03
2009/0091739 A1 4/2009 Kim et al.
(Continued)

FOREIGN PATENT DOCUMENTS

CN   103576160 A   2/2013
CN   105308626 A   2/2016
(Continued)

OTHER PUBLICATIONS

European Search Report in Application No. 18863607.0 dated Aug. 24, 2020.
(Continued)

*Primary Examiner* — James M Hannett
(74) *Attorney, Agent, or Firm* — Maschoff Brennan

(57) ABSTRACT

A depth information acquisition system, a depth information acquisition method, a camera module, and an electronic device are provided. The depth information acquisition system includes a laser beam emission device, a laser beam reception device, a photoelectric sensing device and a processor, the laser beam reception device and the photoelectric sensing device are located on a laser beam transmission route of the laser beam emission device, and both the laser beam emission device and the photoelectric sensing device are electrically connected to the processor. The laser beam emission device includes at least two laser sources corresponding to different environment brightness values, the processor is configured to acquire depth information of a to-be-measured object based on a laser transmission time of a target laser source, and the target laser source is a laser source matching brightness value of an environment where the to-be-measured object is located.

14 Claims, 2 Drawing Sheets

(56) References Cited

U.S. PATENT DOCUMENTS

| | | | |
|---|---|---|---|
| 2011/0063437 A1* | 3/2011 | Watanabe | G01S 7/4802 |
| | | | 348/140 |
| 2014/0043309 A1 | 2/2014 | Go et al. | |
| 2016/0109575 A1 | 4/2016 | Oggier et al. | |
| 2017/0127047 A1* | 5/2017 | Jeon | H04N 13/271 |
| 2017/0148376 A1 | 5/2017 | Yoo et al. | |

FOREIGN PATENT DOCUMENTS

| | | |
|---|---|---|
| CN | 105705962 A | 6/2016 |
| CN | 106501959 A | 3/2017 |
| CN | 107018295 A | 8/2017 |
| CN | 107607957 A | 1/2018 |

OTHER PUBLICATIONS

Written Opinion and International Search Report in Application No. PCT/CN2018/102694 dated Apr. 9, 2020.

* cited by examiner

DEPTH INFORMATION ACQUISITION SYSTEM AND METHOD, CAMERA MODULE, AND ELECTRONIC DEVICE

CROSS-REFERENCE TO RELATED APPLICATION

The present application is the U.S. national phase of PCT Application No. PCT/CN2018/102694 filed on Aug. 28, 2018, which claims a priority of the Chinese patent application No. 201710891594.3 filed on Sep. 27, 2017, which is incorporated herein by reference in its entirety.

TECHNICAL FIELD

The present disclosure relates to the field of communication technology, in particular to a depth information acquisition system, a depth information acquisition method, a camera module, and an electronic device.

BACKGROUND

With the development of communication technology, the functions of electronic devices are becoming more and more powerful, and a Time of Flight (TOF) technology has been used to detect depth information of a to-be-measured object. In the TOF technology, a modulated near-infrared light beam is emitted by a sensor to the to-be-measured object, and then reflected by the to-be-measured object back to the sensor. A time difference or a phase difference between the emitted light beam and the reflected light beam is calculated, so as to calculate a distance of the to-be-measured object, thereby to acquire the depth information. Through a camera, a three-dimensional (3D) profile of the to-be-measured object is presented in the form of a topographical map in which different colors represent different distances. In the related TOF technology, a laser beam having a wavelength of 850 nm is used. However, there is a large quantity of light beams having a wavelength of 850 nm in a bright environment, so the reference noise for the electronic device is relatively large when using the TOF technology in the bright environment, and thereby depth identification accuracy of the electronic device is relatively low. Based on the above, the accuracy of the acquired depth information of a conventional depth information acquisition system is relatively low.

SUMMARY

In one aspect, the present disclosure provides in some embodiments a depth information acquisition system, including: a laser beam emission device, a laser beam reception device, a photoelectric sensing device and a processor, the laser beam reception device and the photoelectric sensing device are located on a laser beam transmission route of the laser beam emission device, and both the laser beam emission device and the photoelectric sensing device are electrically connected to the processor. The laser beam emission device includes at least two laser sources corresponding to different environment brightness values. The processor is configured to acquire depth information of a to-be-measured object based on a laser transmission time of a target laser source, and the target laser source is a laser source matching brightness value of an environment where the to-be-measured object is located.

In another aspect, the present disclosure provides in some embodiments a depth information acquisition method for the above-mentioned depth information acquisition system, including: controlling a target laser source of the laser beam emission device in the depth information acquisition system to emit a target laser beam to a to-be-measured object, wherein the target laser source includes at least one laser source that matches the brightness value of the environment where the to-be-measured object is located among at least two laser sources of the laser beam emission device; controlling the photoelectric sensing device in the depth information acquisition system to sense the target laser beam; and acquiring depth information of the to-be-measured object based on a transmission time of the target laser beam.

In yet another aspect, the present disclosure provides in some embodiments a camera module, including a camera body, and the above-mentioned depth information acquisition system. The laser beam emission device, the laser beam reception device, and the photoelectric sensing device of the depth information acquisition system are all arranged to face a camera of the camera body.

In still yet another aspect, the present disclosure provides in some embodiments an electronic device, including a device body and the above-mentioned depth information acquisition system.

In still yet another aspect, the present disclosure provides in some embodiments an electronic device, including a memory, a processor, and a computer program stored in the memory and executed by the processor, wherein the processor is configured to execute the computer program so as to implement the above-mentioned depth information acquisition method.

In still yet another aspect, the present disclosure provides in some embodiments a computer-readable storage medium storing therein a computer program. The computer program is executed by a processor so as to implement the above-mentioned depth information acquisition method.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a depth information acquisition system, a photoelectric sensing device is provided with a plurality of photosensitive regions configured to sense laser beams at different wavelengths and arranged in such a manner as to cover the entire photoelectric sensing device, so as to acquire accurate and complete depth information of a to-be-measured object, thereby to further improve the accuracy of the acquired depth information.

Figure 1:
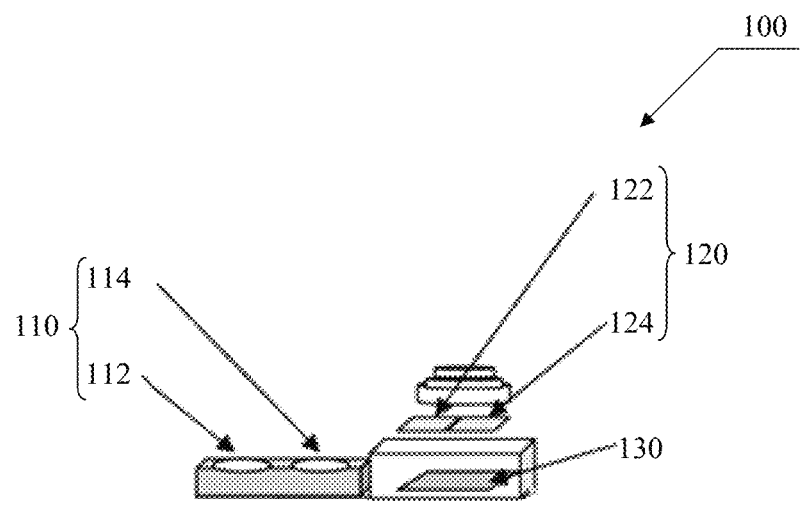
FIG. 1 is a schematic view of a depth information acquisition system according to one embodiment of the present disclosure.

Referring to FIG. 1, the depth information acquisition system 100 includes a laser beam emission device 110, a laser beam reception device 120, a photoelectric sensing device 130 and a processor (not shown). Both the laser beam emission device 110 and the photoelectric sensing device 130 are electrically connected to the processor, and the laser beam reception device 120 and the photoelectric sensing device 130 are located on a laser beam transmission route of the laser beam emission device 110.

The laser beam emission device 100 may include at least two laser sources corresponding to different environment brightness values and being capable of emitting laser beams at different wavelengths. In different environments having different brightness, the amount of interference light beams may be different. For example, in an indoor or dark environment, there is a large quantity of light beams at a wavelength of 940 nm and in the vicinity of 940 nm, so an operation of the depth information acquisition system 100 may be easily interfered during the sensing of the laser beams at the wavelength of 940 nm or in the vicinity of 940 nm. In an outdoor or bright environment, there is a large quantity of light beams at a wavelength of 850 nm and in the vicinity of 850 nm, so the operation of the depth information acquisition system 100 may be easily interfered during the sensing of the laser beams at the wavelength of 850 nm and in the vicinity of 850 nm. Hence, the laser beam emission device 110 may include different laser sources corresponding to different environment brightness values, so as to reduce the quantity of the laser beams emitted by each laser source and at the same wavelength as the light beams in the corresponding environment. As a result, it is able to prevent the operation of the depth information acquisition system 100 from being adversely affected, thereby to improve the accuracy of the acquired depth information.

Based on the above, the laser beam emission device 110 may include a first laser source 112 corresponding to a first environment brightness value and a second laser source 114 corresponding to a second environment brightness value, the first environment brightness value is more than the second environment value. The first environment brightness value may be a brightness value in the outdoor or bright environment, and the second environment brightness value may be a brightness value in the indoor or dark environment. The first environment brightness value and the second environment brightness value are not be particularly defined herein.

In a possible embodiment of the present disclosure, the depth information acquisition system may determine the environment brightness value of the to-be-measured object based on an environment brightness value or an environment mode inputted by a user, or determine the environment brightness value based on whether the location is indoor or outdoor, or determine an environment brightness mode based on whether a current time is day or night, which will not be particularly defined herein.

In some other possible embodiments of the present disclosure, the depth information acquisition system 100 may further include a brightness acquisition device configured to acquire the environment brightness value of the to-be-measured object. The brightness acquisition device may be connected to the processor and transmit the acquired environment brightness value to the processor. The processor may select the laser source that matches the environment brightness value based on the environment brightness value. The brightness acquisition device may be a photosensitive sensor configured to detect a light intensity in the environment, so as to determine whether the environment brightness value of the to-be-measured object is the first environment brightness value or the second environment brightness value.

Considering that there are few interference light beams at a wavelength of 940 nm in a brighter environment, a first laser beam emitted by the first laser source 112 may be at a wavelength of 900 nm to 950 nm. In addition, there are few interference light beams at a wavelength of 850 nm in a darker environment, a second laser beam emitted by the second laser source 114 may be at a wavelength of 810 nm to 870 nm. In a possible embodiment of the present disclosure, the first laser beam emitted by the first laser source 112 may be at a wavelength of 940 nm, and the second laser beam emitted by the second laser source 114 may be at a wavelength of 850 nm.

The laser beam reception device 120 may be located at a photosensitive region of the photoelectric sensing device 130, and configured to receive the laser beams which are transmitted by the laser beam emission device 110 and reflected by the to-be-measured object, and transmit the received light beams to the photoelectric sensing device 130. The laser beam reception device 120 may be a filter capable of filtering out the laser beams at same wavelengths as the laser beams emitted by the at least two laser sources. In the embodiments of the present disclosure, when the laser beam emission device 110 includes the first laser source 112 and the second laser source 114, the laser beam reception device 120 may receive the laser beams emitted by the first laser source 112 and the second laser source 114, and filter out the laser beams at the other wavelengths, so as to improve the photoelectric sensing accuracy and reduce environment light interference.

The processor may be connected to the laser beam emission device 110 and the photoelectric sensing device 130, and acquire data about the laser beams emitted by the laser beam emission device 110 and data about the laser beams sensed by the photoelectric sensing device 130. The processor may determine the laser source that matches the environment brightness value as a target laser source based on the environment brightness value of the to-be-measured object, and calculate distance information of multiple test points on the to-be-measured object based on a transmission time of a target laser beam emitted by the target laser source, so as to calculate the depth information of the to-be-measured object.

When the depth information acquisition system 100 needs to acquire the depth information of the to-be-measured object, the processor may control the at least two laser sources of the laser beam emission device 110 to emit the laser beams to the to-be-measured object, and the laser beams may arrived to a surface of the to-be-measured object and be reflected by the surface of the to-be-measured object toward the laser beam reception device 120. The laser beam reception device 120 may, after filtering out the interference laser beams, transmit the laser beams to the photoelectric sensing device 130. The processor may determine the laser source that matches the environment brightness value of the to-be-measured object as the target laser source based on the brightness of the environment where the to-be-measured object is located, control the photoelectric sensing device 130 to sense the target laser beam, and calculate the depth information of the to-be-measured object based on the transmission time of the target laser beam.

According to the depth information acquisition system 100 in the embodiments of the present disclosure, the laser beam emission device 110 may include the laser sources corresponding to different environment brightness values, the photoelectric sensing device 130 may sense the target laser beam emitted by the target laser source that matches the environment brightness value of the to-be-measured object, so as to acquire the depth information of the to-be-measured object. As a result, through setting the at least two laser sources corresponding to different environment brightness values, it is able to calculate the depth information of the to-be-measured object based on the target laser beam that matches the environment brightness value, thereby to reduce the quantity of the interference light beams in the environment and improve the accuracy of the acquired depth information.

As shown in FIG. 1, based on the above, the laser beam reception device 120 may include a first filter 122 and a second filter 124. The first filter 122 is configured to receive the first laser beam and filter out the light beams at a different wavelength from the first laser beam, and the second filter 124 is configured to receive the second laser beam and filter out the light beams at a different wavelength from the second laser beam. The first filter and the second filter may be both located at the photosensitive region of the photoelectric sensing device 130, so as to enable the photoelectric sensing device 130 to collect the laser beams from the laser beam emission device 110 for the photoelectric sensing operation.

To provide better transmittance, a coverage region of the first filter may not coincide with that of the second filter. The first filter 122 and the second filter 124 may be located in a same plane in such a manner as to adjoin each other or spaced apart from each other at a certain interval. In a possible embodiment of the present disclosure, the first filter 122 and the second filter 124 may also be formed as one piece, and it may include a first filter region configured to receive the first laser beam emitted by the first laser source 112, and a second filter region configured to receive the second laser beam emitted by the second laser source 114. The first filter region and the second filter region may be arranged in such a manner as to adjoin each other or be spaced apart from each other at a certain interval, which will not be particularly defined herein.

In some other embodiments of the present disclosure, the first filter 122 and the second filter 124 may also be located in different planes with different vertical distances from the photosensitive region of the photoelectric sensing device. Of course, any other arrangement modes of the filters of the laser beam reception device 120 capable of receiving the laser beams emitted by the at least two laser sources of the laser beam emission device 110 may also be applied, which will not be particularly defined herein.

Based on the above, as shown in FIG. 1, the first filter 122 and the second filter 124 may be arranged in such a manner as to adjoin each other in the same plane parallel to the photosensitive region of the photoelectric sensing device 130. Correspondingly, the photosensitive region of the photoelectric sensing device 130 may include a first photosensitive region 132 for sensing the first laser beam, and a second photosensitive region 134 for sensing the second laser beam. The photosensitive region corresponding to the first filter 122 may be set as the first photosensitive region 132, and the photosensitive region corresponding to the second filter 124 may be set as the second photosensitive region 134. The first filter 122 and the second filter 124 may be arranged in various shape combinations, e.g., concentric circles, rings, adjoining rectangles, which will not be particularly defined herein. The processor may merely control the photoelectric sensing device 130 to sense the laser beams reaching the photosensitive region corresponding to the target laser source, or merely acquire transmission data about the laser beams reaching the photosensitive region corresponding to the target laser source, so as to calculate the depth information of the to-be-measured object. In some special environments, when the first laser beam and the second laser beam are sensed by the photoelectric sensing device 130 at the photosensitive region in a better manner and there is less interference information from the environment, the depth information may be calculated based on the laser beams sensed by the photosensitive regions corresponding to the first filter and the second filter, which will not be particularly defined herein.

Figure 2:
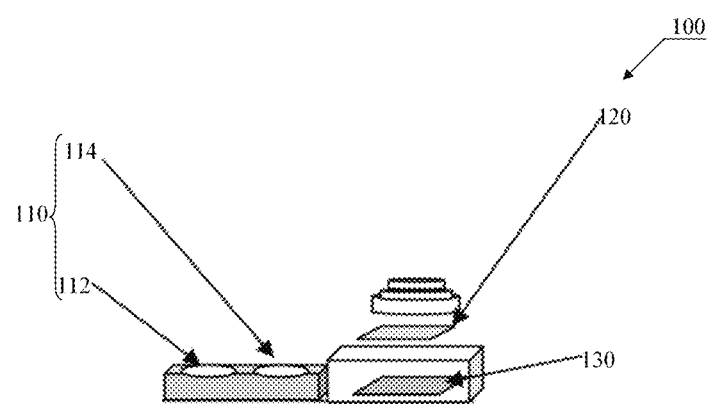
FIG. 2 is another schematic view of the depth information acquisition system according to one embodiment of the present disclosure.

Referring to FIG. 2, as compared with the depth information acquisition system 100 mentioned hereinabove, the laser beam reception device 120 and the photoelectric sensing device 130 may each be of a different structure. As shown in FIG. 2, the depth information acquisition system 100 may include the laser beam emission device 110, the laser beam reception device 120, the photoelectric sensing device 130, and the processor. The laser beam reception device 120 and the photoelectric sensing device 130 may be both located on the laser beam transmission route of the laser beam emission device 110, and both the laser beam emission device 110 and the photoelectric sensing device 130 may be electrically connected to the processor.

The laser beam emission device 110 may include the first laser source 112 corresponding to a first environment brightness value, and the second laser source 114 corresponding to a second environment brightness value, the first environment brightness value is more than the second environment brightness value.

The laser beam reception device 120 may include a filter, which includes a first filter region and a second filter region spaced apart from each other at a certain interval, so as to allow a majority of the first laser beams and the second laser beams reflected by the to-be-measured object to pass therethrough and converge all received first laser beams and second laser beams to the photosensitive region of the photoelectric induction device 130.

The photosensitive region of the photoelectric sensing device 130 may include a first photosensitive region 132 for sensing the first laser beam, and a second photosensitive region 134 for sensing the second laser beam. The first photosensitive region 132 and the second photosensitive region 134 may be spaced apart from each other at a certain interval, so as to enable the photosensitive region of the photoelectric sensing device 130 to receive more complete depth information of the to-be-measured object.

Figure 3:
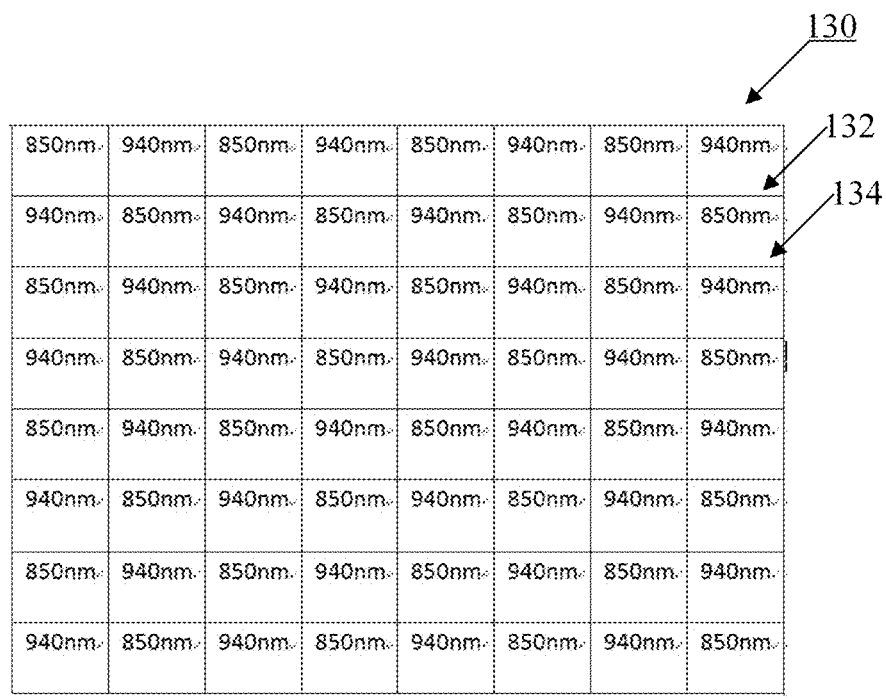
FIG. 3 is a schematic view of a photosensitive region of a photoelectric sensing device of the depth information acquisition system according to one embodiment of the present disclosure.

As shown in FIG. 3, based on the above, the first laser beam emitted by the first laser source 112 may have a wavelength of 940 nm, and the second laser beam emitted by the second laser source 114 may have a wavelength of 850 nm. Pixels of the photoelectric sensing device 130 may be distributed as follows. The pixels of the photoelectric sensing device 130 may include two types of color filters arranged alternately, with one type of color filters to allow merely the first laser beam having a wavelength of 940 nm to pass therethrough, and the other type of color filters to allow merely the second laser beam having a wavelength of 850 nm to pass therethrough. The two types of color filters may be arranged uniformly in the photoelectric sensing device 130. During the acquisition of the depth information of the to-be-measured object, complete image information may be acquired through each of the two types of laser beams having different wavelengths. In some other embodiments of the present disclosure, according to the practical need, the photoelectric sensing device 130 may also include the pixels whose color filters correspond to the laser beams at the other wavelengths and are distributed at different proportions, which will not be particularly defined herein.

According to the depth information acquisition system 100 in the embodiments of the present disclosure, when acquiring the depth information of the to-be-measured object, the environment brightness value of the to-be-measured object may be determine and then the target laser source that matches the environment brightness value may be selected. When the environment brightness value refers to the outdoor or bright environment, the first laser source 112 may be determined as the target laser source, and when the environment brightness value refers to the indoor or dark environment, the second laser source 114 may be determined as the target laser source. The target laser source may be enabled so as to emit the target laser beam, the laser beam emission device 110 may receive the target laser beam through the corresponding filter regions, and the photoelectric sensing device 130 may sense the target laser beams through the corresponding photosensitive regions to form an image, thereby to acquire accurate and complete depth information of the to-be-measured object.

Figure 4:
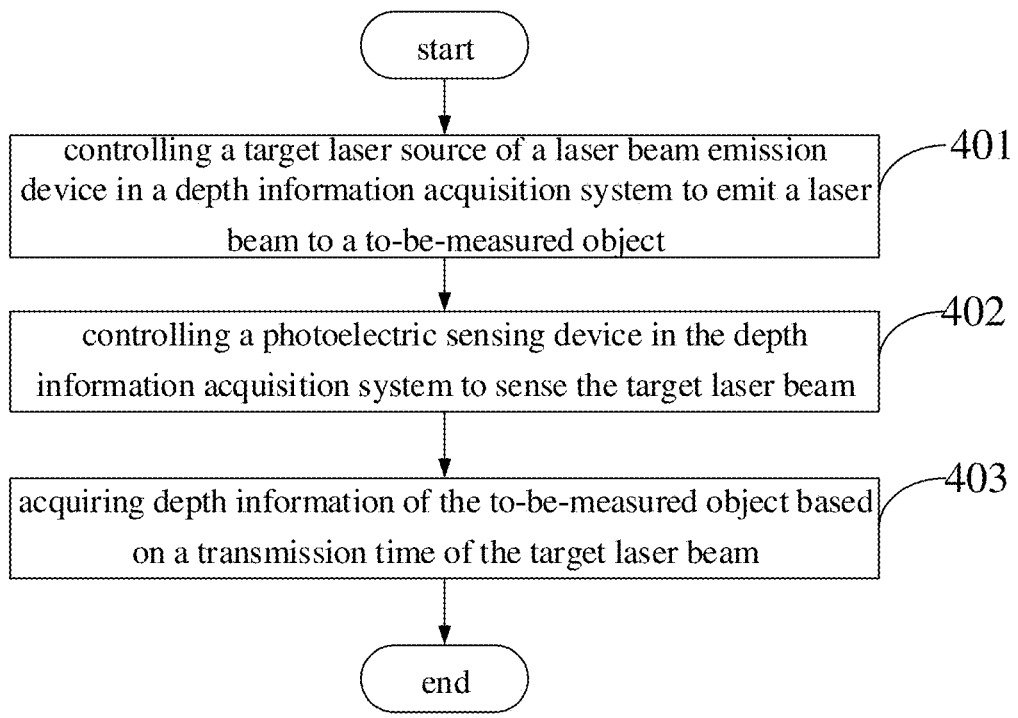
FIG. 4 is a flow chart of a depth information acquisition method according to one embodiment of the present disclosure.

The present disclosure further provides in some embodiments a depth information acquisition method for the above-mentioned depth information acquisition system which, as shown in FIG. 4, includes the following steps.

Step 401: controlling a target laser source of the laser beam emission device in the depth information acquisition system to emit a target laser beam to a to-be-measured object.

To acquire the depth information of the to-be-measured object, the processor needs to control the laser beam emission device to emit the laser beam to the to-be-measured object, and determine the target laser beam emitted by the target laser source that needs to be sensed. The target laser source may include at least one laser source that matches the environment brightness value of the to-be-measured object in at least two laser sources of the laser beam emission device.

In a possible embodiment of the present disclosure, the processor may control the at least two laser sources of the laser beam emission device to emit the laser beams to the to-be-measured object, determine the laser source that matches the environment brightness value as the target laser source based on the environment brightness value, and determine the laser beam emitted by the target laser source as the target laser beam.

In another possible embodiment of the present disclosure, the processor may also determine a laser source that matches the environment brightness value of the to-be-measured object as the target laser source, and determine the laser beam emitted by the target laser source as the target laser beam. The processor may merely control the target laser source to emit the laser beam.

Step 402: controlling the photoelectric sensing device of the depth information acquisition system to sense the target laser beam.

After the target laser source has been controlled to emit the target laser beam to the to-be-measured object, the photoelectric sensing device may be controlled to sense the target laser beam, and the processor may acquire the transmission data about the target laser beam reaching the photosensitive region.

Step 403: acquiring the depth information of the to-be-measured object based on transmission time of the target laser beam.

After the acquisition of the transmission data about the target laser beam reaching the corresponding photosensitive region, the depth information of the to-be-measured object may be acquired based on the transmission time of the target laser beam.

Based on the above, the depth information acquisition system may further include a brightness acquisition device connected to the processor. The brightness acquisition device may acquire the environment brightness value of the to-be-measured object and transmit it to the processor. The processor may determine the target laser source that matches the environment brightness value based on the received environment brightness value, and then control emission and reception operations of the target laser source. Through the additional brightness acquisition device, it is able to automatically select the matched target laser source based on the environment brightness value, thereby to improve the accuracy and convenience for the acquisition of the depth information.

According to the depth information acquisition method in the embodiments of the present disclosure, the laser beam emission device may include the laser sources corresponding to different environment brightness values, and the photoelectric sensing device may sense the target laser beam emitted by the target laser source that matches the environment brightness value of the to-be-measured object, so as to acquire the depth information of the to-be-measured object. Through the at least two laser sources corresponding to different environment brightness values, it is able to calculate the depth information of the to-be-measured object based on the target laser beam that matches the environment brightness value, thereby to reduce the quantity of interference light beams in the environment, and improve the accuracy of the acquired depth information. The implementation of the depth information acquisition method may refer to that of the depth information acquisition system mentioned hereinabove, which will thus not be particularly defined herein.

The present disclosure further provides in some embodiments a camera module, including a camera body and the above-mentioned depth information acquisition system. The laser beam emission device, the laser beam reception device, and the photoelectric sensing device of the depth information acquisition system may all be optically coupled to a camera of the camera body. Through the optical coupling with the to-be-measured object using the camera, it is able to acquire the depth information of the to-be-measured object.

According to the camera module in the embodiments of the present disclosure, the laser beam emission device, the laser beam reception device, and the photoelectric sensing device of the depth information acquisition system may be optically coupled to the camera of the camera body. The laser beam emission device may include the laser sources corresponding to different environment brightness values, and the photoelectric sensing device may sense the target laser beam emitted by the target laser source that matches the environment brightness value of the to-be-measured object, so as to acquire the depth information of the to-be-measured object. Through the at least two laser sources corresponding to different environment brightness values, it is able to calculate the depth information of the to-be-measured object based on the target laser beam that matches the environment brightness value, thereby to reduce the quantity of interference light beams in the environment, and improve the accuracy of the acquired depth information. The implementation of the camera module may refer to that of the depth information acquisition system mentioned hereinabove, which will thus not be particularly defined herein.

The present disclosure further provides in some embodiments an electronic device, including a device body and a depth information acquisition system arranged in the device body. In the electronic device, both the laser beam emission device and the photoelectric sensing device of the depth information acquisition system may be electrically connected to the processor, and the laser beam reception device and the photoelectric sensing device may be both located on a transmission route of the laser beam emission device.

According to the embodiments of the present disclosure, the electronic device may include the device body and the depth information acquisition system. The laser beam emission device, the laser beam reception device, and the photoelectric sensing device of the depth information acquisition system may be optically coupled to the camera of the camera body. The laser beam emission device may include the laser sources corresponding to different environment brightness values, and the photoelectric sensing device may sense the target laser beam emitted by the target laser source that matches the environment brightness value of the to-be-measured object, so as to acquire the depth information of the to-be-measured object. Through the at least two laser sources corresponding to different environment brightness values, it is able to calculate the depth information of the to-be-measured object based on the target laser beam that matches the environment brightness value, thereby to reduce the quantity of interference light beams in the environment, and improve the accuracy of the acquired depth information. The implementation of the electronic device may refer to that of the depth information acquisition system mentioned hereinabove, which will thus not be particularly defined herein.

The present disclosure further provides in some embodiments an electronic device, including a memory, a processor, and a computer program stored in the memory and executed by the processor. The processor is configured to execute the computer program so as to implement the above-mentioned depth information acquisition method.

The present disclosure further provides in some embodiments a computer-readable storage medium storing therein a computer program. The computer program is executed by a processor so as to implement the above-mentioned depth information acquisition method with a same beneficial effect, which will not be particularly defined herein. The computer-readable storage medium may be a Read Only Memory (ROM), a Random Access Memory (RAM), a magnetic disc or an optical disc.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, the electronic device and the units described hereinabove may refer to the corresponding procedures in the method embodiment, and thus will not be particularly defined herein.

It should be further appreciated that, the system, apparatus and method may be implemented in any other ways. For example, the embodiments for the apparatus are merely for illustrative purposes, and the units are provided merely on the basis of their logic functions. During the actual application, some units may be combined together or integrated into another system. Alternatively, some functions of the units may be omitted or not executed. In addition, the coupling connection, direct coupling connection or communication connection between the units may be implemented via interfaces, devices or units, and the indirect coupling connection or communication connection between the units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected based on the practical need, so as to achieve the purpose of the present disclosure.

In addition, the functional units in the embodiments of the present disclosure may be integrated into a processing unit, or the functional units may exist independently, or two or more functional units may be combined together. In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), ROM, RAM, a magnetic disk or an optical disk.

It should be further appreciated that, all or part of the steps in the method may be accomplished through the related hardware using the computer program, and the computer program may be stored in a computer-readable storage medium. The program is executed so as to implement the steps mentioned in the method embodiments. The storage medium may be a magnetic disk, an optical disk, an ROM or an RAM.

The above embodiments are merely for illustrative purposes, but shall not be construed as limiting the scope of the present disclosure. Any person skilled in the art may make modifications and substitutions without departing from the spirit of the present disclosure, and these modifications and substitutions shall also fall within the scope of the present disclosure. Hence, the scope of the present disclosure shall be subject to the scope defined by the appended claims.

What is claimed is:

1. A depth information acquisition system, comprising a laser beam emission device, a laser beam reception device, a photoelectric sensing device and a processor, wherein the laser beam reception device and the photoelectric sensing device are located on a laser beam transmission route of the laser beam emission device, and both the laser beam emission device and the photoelectric sensing device are electrically connected to the processor, the laser beam emission device comprises at least two laser sources corresponding to different environment brightness values, the processor is configured to:

determine, based on an environment brightness value of an environment where a to-be-measured object is located, a target laser source matching with the environment brightness value from the at least two laser sources; and acquire depth information of the to-be-measured object based on a laser transmission time of the target laser source;

wherein the laser beam emission device comprises a first laser source corresponding to a first environment brightness value and a second laser source corresponding to a second environment brightness value, the first environment brightness value is more than the second environment brightness value, the first laser source is configured to emit a first laser beam at a wavelength of 900 nm to 950 nm, and the second laser source is configured to emit a second laser beam at a wavelength of 810 nm to 870 nm, wherein, the laser beam reception device comprises a first filter configured to receive the first laser beam, and a second filter configured to receive the second laser beam, and the first filter and the second filter are located on a photosensitive region of the photoelectric sensing device; or the laser beam reception device comprises a filter provided with a first filter region and a second filter region, the first filter region is configured to receive the first laser beam emitted by the first laser source, and the second filter region is configured to receive the second laser beam emitted by the second laser source.

2. The depth information acquisition system according to claim 1, further comprising a brightness acquisition device connected to the processor, and configured to acquire the brightness value of the environment where the to-be-measured object is located, and transmit the acquired brightness value to the processor.

3. The depth information acquisition system according to claim 1, wherein the first laser beam has a wavelength of 940 nm and the second laser beam has a wavelength of 850 nm.

4. The depth information acquisition system according to claim 1, wherein the first filter and the second filter are located on a same plane.

5. The depth information acquisition system according to claim 1, wherein the first filter region and the second filter region adjoin to each other and are arranged at the photosensitive region of the photoelectric sensing device.

6. The depth information acquisition system according to claim 1, wherein the photoelectric sensing device comprises a first photosensitive region for sensing the first laser beam and a second photosensitive region for sensing the second laser beam, and the first photosensitive region and the second photosensitive region are spaced apart from each other at a certain interval.

7. A depth information acquisition method applied for the depth information acquisition system according to claim 1, comprising:

controlling a target laser source of the laser beam emission device in the depth information acquisition system to emit a target laser beam to a to-be-measured object, the target laser source comprising at least one laser source that matches the brightness value of the environment where the to-be-measured object is located among at least two laser sources of the laser beam emission device;

controlling the photoelectric sensing device in the depth information acquisition system to sense the target laser beam; and acquiring depth information of the to-be-measured object based on a transmission time of the target laser beam.

8. The depth information acquisition method according to claim 7, wherein the depth information acquisition system further comprises a brightness acquisition device connected to the processor, wherein prior to controlling the target laser source of the laser beam emission device in the depth information acquisition system to emit the target laser beam to the to-be-measured object, the depth information acquisition method further comprises:

determining the target laser source that matches the brightness value of the environment based on the brightness value of the environment where the to-be-measured object is located acquired by the brightness acquisition device.

9. The depth information acquisition method according to claim 7, wherein the controlling the target laser source of the laser beam emission device in the depth information acquisition system to emit the target laser beam to the to-be-measured object comprises:

controlling the at least two laser sources of the laser beam emission device to emit the laser beams to the to-be-measured object; and determining the laser beam emitted by a laser source that matches the brightness value of the environment where the to-be-measured object is located as the target laser beam.

10. The depth information acquisition method according to claim 7, wherein the controlling the target laser source of the laser beam emission device in the depth information acquisition system to emit the target laser beam to the to-be-measured object comprises:

determining a laser source that matches the brightness value of the environment where the to-be-measured object is located as the target laser source; and controlling the target laser source to emit the target laser beam to the to-be-measured object.

11. A camera module, comprising a camera body and the depth information acquisition system according to claim 1, wherein the laser emission device, the laser beam reception device, and the photoelectric sensing device of the depth information acquisition system are all arranged to face a camera of the camera body.

12. An electronic device, comprising a device body and the depth information acquisition system according to claim 1.

13. An electronic device, comprising a memory, a processor, and a computer program stored in the memory and executed by the processor, wherein the processor is configured to execute the computer program so as to implement the depth information acquisition method according to claim 7.

14. A non-transitory computer-readable storage medium storing therein a computer program, wherein the computer program is executed by a processor so as to implement the depth information acquisition method according to claim 7.

* * * * *